United States Patent
Yu

(10) Patent No.: US 7,587,176 B2
(45) Date of Patent: Sep. 8, 2009

(54) MODE SWITCHING IN TRANSCEIVER OF A MOBILE TERMINAL

(75) Inventor: Jae Wook Yu, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 923 days.

(21) Appl. No.: 10/646,126

(22) Filed: Aug. 22, 2003

(65) Prior Publication Data

US 2004/0052271 A1    Mar. 18, 2004

(30) Foreign Application Priority Data

Aug. 29, 2002    (KR) .................... 10-2002-0051580

(51) Int. Cl.
*H04B 1/44* (2006.01)
(52) U.S. Cl. .................... 455/78; 370/323; 370/325
(58) Field of Classification Search ............ 455/83, 455/86, 76, 78, 450, 447, 63.1, 67.11, 67.13; 370/445, 347, 337, 294, 280, 293, 329, 341
See application file for complete search history.

(56) References Cited

U.S. PATENT DOCUMENTS

| 6,226,276 | B1 * | 5/2001 | Na ........................ 370/294 |
| 6,388,997 | B1 * | 5/2002 | Scott .................... 370/280 |
| 6,859,655 | B2 * | 2/2005 | Struhsaker ............ 455/450 |
| 2002/0071415 | A1 * | 6/2002 | Soulabail et al. ..... 370/337 |
| 2003/0026215 | A1 * | 2/2003 | Schafer ................ 370/280 |

* cited by examiner

*Primary Examiner*—Duc Nguyen
*Assistant Examiner*—Zhiyu Lu
(74) *Attorney, Agent, or Firm*—Lee, Hong, Degerman, Kang & Waimey

(57) ABSTRACT

A mode switching method in a mobile communication system is provided. The method comprises providing a mode switching start point between an uplink signal and a downlink signal of a transceiver; resetting the mode switching start point based on length of a guard period provided between the uplink signal and the downlink signal; and starting mode switching at the mode switching start point.

10 Claims, 4 Drawing Sheets

MODE SWITCHING IN TRANSCEIVER OF A MOBILE TERMINAL

CROSS REFERENCE TO RELATED APPLICATION

Pursuant to 35 U.S.C. § 119(a), this application claims the benefit of earlier filing date and right of priority to Korean Patent Application No. 2002-51580, filed on Aug. 29, 2002, the content of which is hereby incorporated by reference herein in its entirety.

BACKGROUND OF THE INVENTION

1. Field of the Invention

The present invention relates to a mobile communication system and, more particularly, to a reception/transmission mode switching method for a transceiver of a mobile terminal in a TDD-based mobile communication system.

2. Description of the Related Art

A time division synchronous CDMA (TD-SCDMA) is a third-generation (3G) mobile communication standard being developed by the initiative of China approved as a third generation mobile communication standard together with WCDMA and CDMA-2000 of the ITU. The TD-SCDMA aims at increasing channel capacity and effective resource management by combining merits of time division duplex (TDD) and uplink synchronization of CDMA with a smart antenna.

In a TDD-based communication system such as the TD-SCDMA, transmission and reception channels are separated in the time domain. A mobile terminal operates reception/transmission modes in alternate steps by switching the mode of a transceiver.

FIG. 1 illustrates the construction of an RF transceiver of a general TD-SCDMA terminal, including a transmission module 15, a reception module 12, and a switch 17 for selectively connecting the reception module 12 and the transmission module 15 to an antenna (ANT). The switch 17 connects the antenna to the transmission module 15 or to the reception module 12, according to a reception/transmission synchronization signal received from a base station.

When the mobile terminal is switched to a reception mode such that the reception module 12 is connected to the antenna, the reception module 12 down-converts a signal received through the antenna to a baseband signal, and the baseband signal is converted into a digital signal by a baseband modem 19.

Meanwhile, when the mobile terminal is switched to the transmission mode such that the transmission module 15 is connected to the antenna, the transmission module 15 converts a digital signal from the baseband modem 19 into an analog signal. The converted analog signal is up-converted into a radio frequency signal in the baseband by the transmission module 15 and is then transmitted through the antenna. Usually, the transmission module 15 and the reception module 12 automatically enter a sleep/standby mode based on a transmission/reception mode switching signal, in order to reduce power consumption.

In a symmetrical TD-SCDMA system, a high speed data rate of 2 Mbps is supported. Uplink and downlink time channels are equally provided in time domain such that the transmission/reception mode conversion of the mobile terminal occurs very frequently. Accordingly, switching control of the power mode of the reception and transmission module 12 and 15 becomes complex.

FIG. 2 illustrates a frame format in a TD-SCDMA system. As shown in FIG. 2, the radio frame has a length of 10 ms and consists of two sub-frames. Each sub-frame is split into a plurality of time slots. An upward time slot TS3 and a downward time slot TS4 are discriminated by a switching point. A minimum guard period (GP) at the switching point is 16 chips (about 12.5 µs). Therefore, the transmission/reception mode switching of the mobile terminal should be performed during the GP, i.e., 16 chips.

Unfortunately, with the current technique, it is difficult to implement a reception/transmission module performing a reception/transmission mode switching in a time period less than 12.5 µm. And, even if the reception/transmission module having a mode switching time less than the minimum guard period is developed, it is not cost effective to implement a high speed reception/transmission module to a TD-SCDMA terminal. A method and system is needed to overcome the above-mentioned shortcomings.

SUMMARY OF THE INVENTION

In accordance with one or more embodiments of the invention, a mode switching method in a mobile communication system is provided. The method comprises providing a mode switching start point between an uplink signal and a downlink signal of a transceiver; resetting the mode switching start point based on length of a guard period provided between the uplink signal and the downlink signal; and starting mode switching at the mode switching start point.

The providing step comprises determining a mode switching time (MST) of the transceiver; determining a minimum guard period (GPmin) of the transceiver; determining whether the MST is greater than the GPmin; and determining the mode switching start point reset, if the MST is greater than the GPmin. The resetting step comprises determining an advancing time offset ($\Delta t$) based on a minimum guard period (GPmin); and setting the mode switching start point before a start point of the minimum guard period (GPmin) of the transceiver based on a mode switching signal.

In certain embodiments, the mode switching start point is determined by determining a time deference between the advancing time offset ($\Delta t$) and the start point of GPmin. The advancing time offset ($\Delta t$) is shorter than the $GP_{min}$, for example. The step of resetting comprises determining an advancing time offset ($\Delta t$) shorter than the GPmin; and setting the mode switching start point before a start point of a minimum guard period (GPmin) of the system based on a mode switching signal.

Accordingly, the mode switching start point is determined by determining the time difference between the advancing time offset ($\Delta t$) and the start point of $GP_{min}$. The advancing time offset ($\Delta t$) is shorter than the $Gp_{min}$, for example, in certain embodiments. Thus, mode switching is perform based on the mode switching start point.

In one or more embodiments, a mode switching method comprises providing a mode switching start point between an uplink signal and a downlink signal of a transceiver; determining an advancing time offset ($\Delta t$) based on a minimum guard period ($GP_{min}$); setting the mode switching start point before a start point of the GPmin of the transceiver based on a mode switching signal; starting mode switching at the mode switching start point; determining a mode switching time (MST) of the transceiver; determining whether the MST is greater than the $GP_{min}$; and determining the mode switching start point reset, if the MST is greater than the $GP_{min}$.

In accordance with another embodiment, a mode switching system in a mobile communication system is provided. The system comprises means for providing a mode switching start point between an uplink signal and a downlink signal of a transceiver; means for resetting the mode switching start point based on length of a guard period provided between the uplink signal and the downlink signal; and means for starting mode switching at the mode switching start point.

The providing means comprises means for determining a mode switching time (MST) of the transceiver; means for determining a minimum guard period ($GP_{min}$) of the transceiver; means for determining whether the MST is greater than the $GP_{min}$; and means for determining the mode switching start point reset, if the MST is greater than the $GP_{min}$. The resetting means comprises means for determining an advancing time offset ($\Delta t$) based on a minimum guard period (GPmin); and means for setting the mode switching start point before a start point of the minimum guard period (GPmin) of the transceiver based on a is mode switching signal.

The mode switching start point is determined by determining a time deference between the advancing time offset ($\Delta t$) and the start point of $GP_{min}$. The advancing time offset ($\Delta t$) is shorter than the Gpmin, in some embodiments. The resetting means comprises determining an advancing time offset ($\Delta t$) shorter than the GPmin; and setting the mode switching start point before a start point of a minimum guard period ($GP_{min}$) of the system based on a mode switching signal.

The mode switching start point is determined by determining the time difference between the advancing time offset ($\Delta t$) and the start point of $GP_{min}$. The advancing time offset ($\Delta t$) is shorter than the $GP_{min}$. According, in one embodiment, the mode switching is performed based on the mode switching start point.

These and other embodiments of the present invention will also become readily apparent to those skilled in the art from the following detailed description of the embodiments having reference to the attached figures, the invention not being limited to any particular embodiments disclosed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

Features, elements, and aspects of the invention that are referenced by the same numerals in different figures represent the same, equivalent, or similar features, elements, or aspects in accordance with one or more embodiments of the system.

DETAILED DESCRIPTION OF THE PREFERRED EMBODIMENTS

In a TDD-based mobile communication system such as the TD-SCDMA, an allocated frequency band is divided into frames in the time domain, with a serial number assigned thereto. Each frame is split into several time slots. The time slots are divided into uplink and downlink time slots to form respective transmission and reception channels. The uplink time slots and the downlink time slots are discriminated by a switching point, in accordance with one embodiment.

Figure 1:
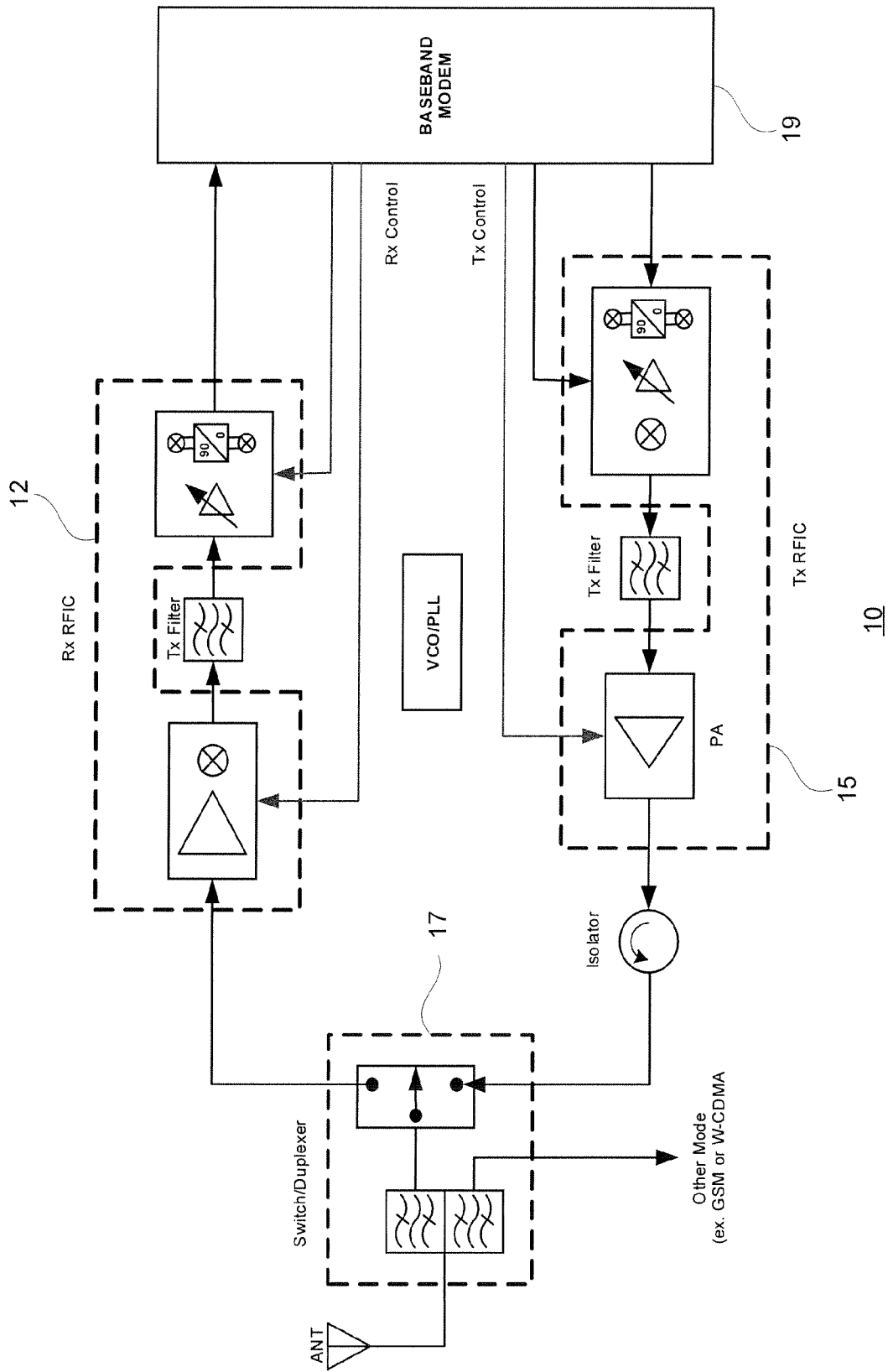
FIG. 1 is a block diagram illustrating a transceiver of a mobile terminal for a TDD-based mobile communication system.
Figure 2:
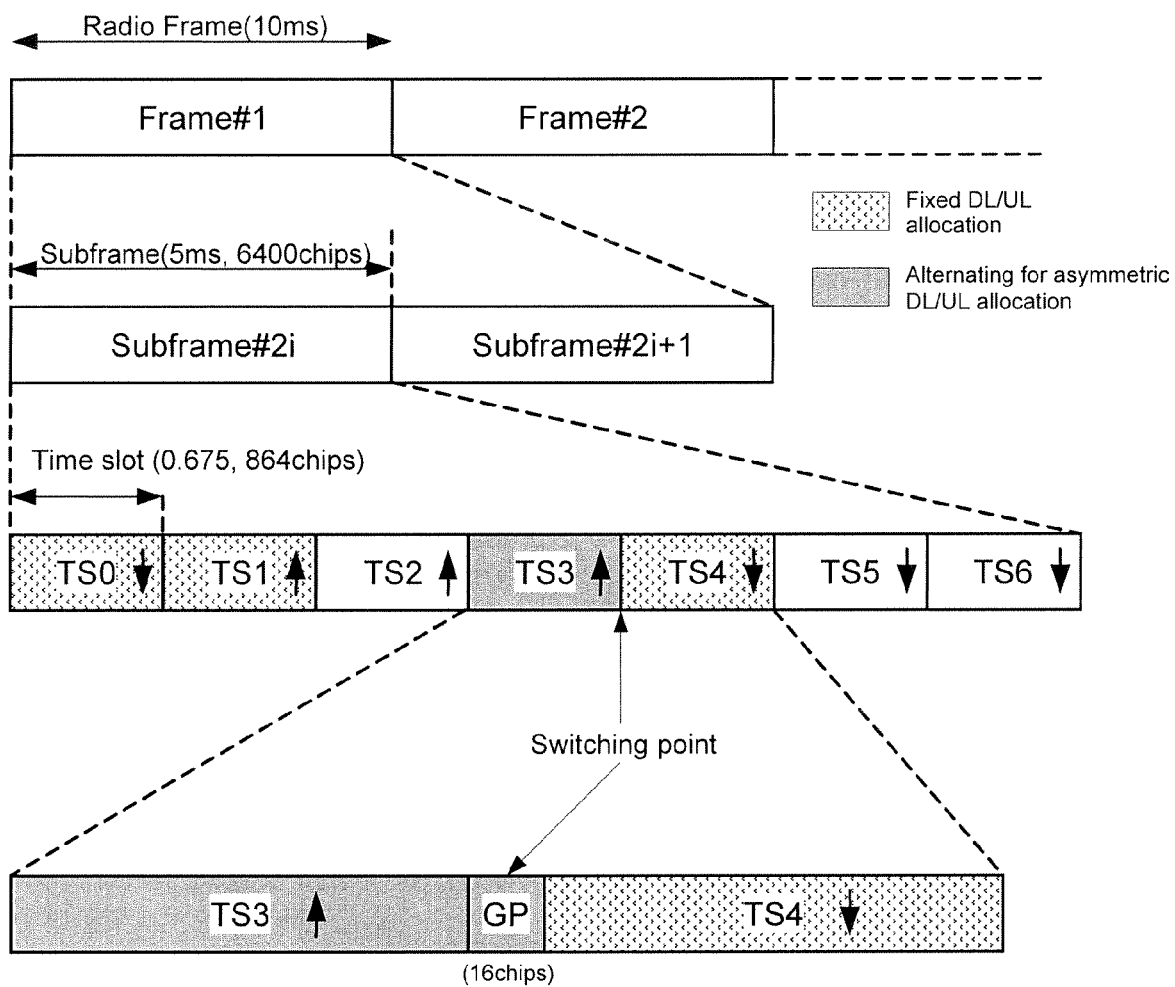
FIG. 2 illustrates a frame format adopted for a TD-SCDMA system, in one or more embodiments of the invention.
Figure 3A:
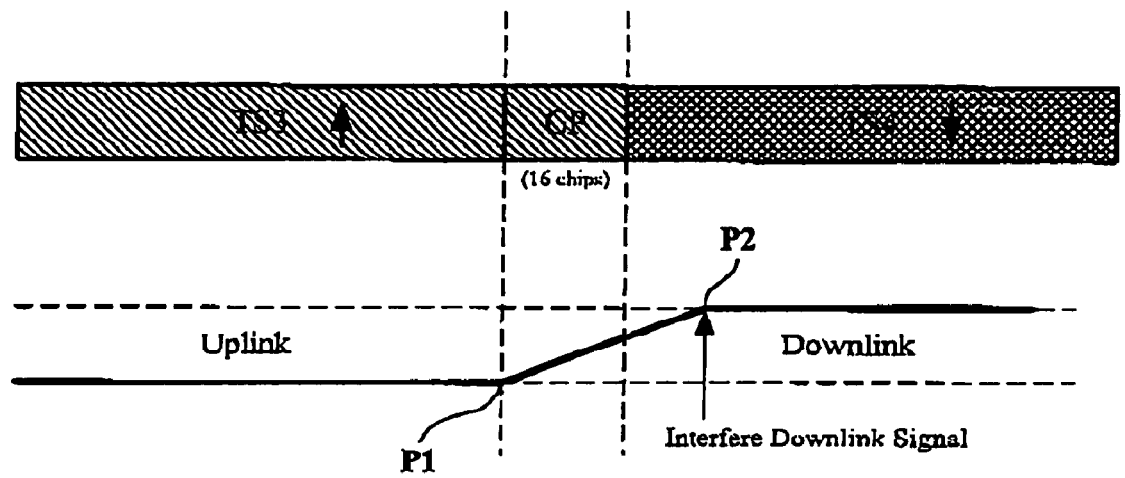
FIG. 3A is a timing diagram illustrating a reception/transmission mode switching method, in accordance with one embodiment.

Referring to FIG. 3A, a guard period (GP) is provided between the uplink time slot (TS3) and the downlink time slot (TS4). A transmission and reception switching is performed within the guard period. In one embodiment, the mode switching of the reception/transmission module starts at a time P1. At time P1, the guard period starts after the uplink time slot ends.

Accordingly, at a low mode switching speed, the mode switching is not timely completed. As a result, the guide period end point P2 ends after the downlink time slot (TS4) has started. When the time period needed for the reception/transmission mode switching of the reception/transmission module is longer than the guard period (e.g., 12.5 µs) in the TD-SCDMA system, the beginning portion of the received/transmitted frame is truncated. Thus, in order for the mode switching of the reception/transmission module to be timely completed, in some embodiments, the mode switching starts ahead of the guard period start point P1.

In accordance with one embodiment of the invention, the mode switching of the reception/transmission module starts before the guard period start point P1, so that the mode switching of the reception/transmission module can be effectively completed regardless of the length of the standardized guard period. In some embodiments, the mode switching starts under the control of an upper layer application, for example.

Figure 3B:
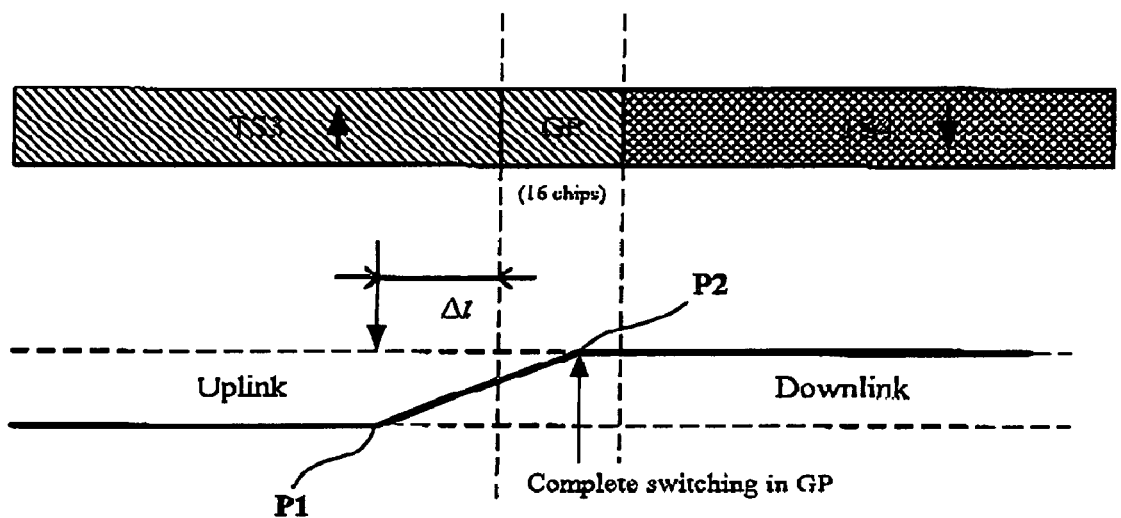
FIG. 3B is a timing diagram illustrating a reception/transmission mode switching method, according to one embodiment of the invention.

As shown in FIG. 3B, by advancing the mode switching start point P1 of the reception/transmission module as much as $\Delta t$ ahead of the guard period start point, the mode switching of the reception/transmission module can be completed before the guard period ends. In one embodiment, $\Delta t$ is not longer than the length of the time slot.

In order to advance the mode switching start point P1 of the reception/transmission module to a point before the guard period start point, an upper layer application, for example, recognizes the time required for the mode switching between the reception/transmission modules and controls the reception/transmission module so that a mode switching start point P1 starts before the guard period start point.

Figure 4:
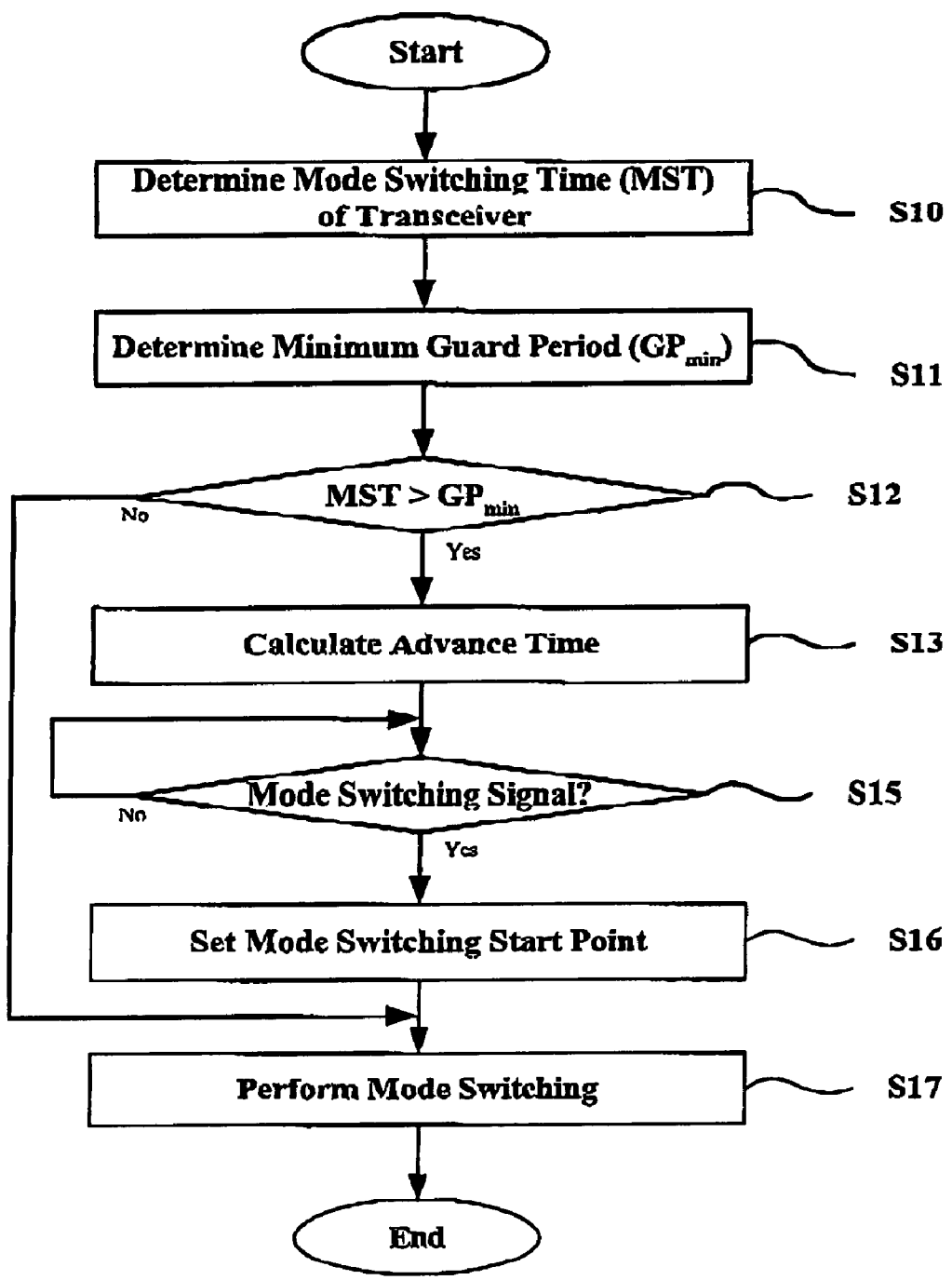
FIG. 4 is a flowchart of the reception/transmission mode switching method for a mobile terminal, in accordance with a preferred embodiment of the invention.

Referring to FIG. 4, when the mobile terminal is turned on, a reception/transmission module management application determines a mode switching time (MST) of the reception/transmission module, at step S10. The mode switching time can be a value set at the time of manufacturing the mobile terminal or a value detected during the transmission and reception procedure. After the mode switching time is determined, the reception/transmission module management application determines a minimum guard period ($GP_{min}$) of the communication system, at step S11.

The module then determines whether the mode switching time is longer than the minimum guard period of the system, at step S12. If the mode switching time of the reception/transmission module is not longer than the minimum guard period of the system, the reception/transmission module management application, at step S17, performs the mode switching without advancing the mode switching start point P1. If the mode switching time of the reception/transmission module is longer than the minimum guard period of the system, the reception/transmission module management application computes a timing advance (Δt), at step S13.

In one embodiment, the reception/transmission module management application determines whether there is a reception/transmission mode switching signal, at step S15. When a reception/transmission mode switching signal is detected, the reception/transmission module management application sets a mode switching start point advanced as much as Δt, for example, at step S16. The module then starts the mode switching at the advanced mode switching start point P1, at step S17.

In one embodiment, since the mode switching start point P1 is under control of the upper layer application, the mode switching is completed by advancing the mode switching start point P1 before the guard period start point, regardless of the length of the guard period. In some embodiments, this is true even when the mode switching time of the reception/transmission module is longer than the guard period of the system.

Further, the mode switching start point P1 of the reception/transmission module can be set according to performance of the reception/transmission module. Thus, the reception/transmission module can be selected freely, resulting in reduction in manufacturing cost of the mobile terminal.

The mode switching method of the present invention enables a reception/transmission module having a mode switching time longer than a minimum guard period of the system to reliably perform the reception/transmission mode switching by advancing the mode switching start point before the guard period start point.

Embodiments of the invention are described by way of example as applicable to systems and corresponding methods that provide a mode switching system in a mobile terminal. In this exemplary embodiment, logic code for performing these methods is implemented in the form of, for example, application software. The logic code, in one embodiment, may be comprised of one or more modules that execute on one or more processors in a distributed or non-distributed communication model.

It should also be understood that the programs, modules, processes, methods, and the like, described herein are but an exemplary implementation and are not related, or limited, to any particular computer, apparatus, or computer programming language. Rather, various types of general-purpose computing machines or devices may be used with logic code implemented in accordance with the teachings provided, herein. Further, the order in which the steps of the present method are performed is purely illustrative in nature. In fact, the steps can be performed in any order or in parallel, unless indicated otherwise by the present disclosure.

The method of the present invention may be performed in either hardware, software, or any combination thereof, as those terms are currently known in the art. In particular, the present method may be carried out by software, firmware, or macrocode operating on a computer or computers of any type. Additionally, software embodying the present invention may comprise computer instructions and be stored in a recording medium (e.g., ROM, RAM, magnetic media, punched tape or card, compact disk (CD), DVD, etc.). Furthermore, such software may be transmitted in the form of a computer signal embodied in a carrier wave, or through communication networks by way of Internet websites, for example. Accordingly, the present invention is not limited to any particular platform, unless specifically stated otherwise in the present disclosure.

Thus, methods and systems for mode switching in a mobile terminal are provided. The present invention has been described above with reference to preferred embodiments. However, those skilled in the art will recognize that changes and modifications may be made in these preferred embodiments without departing from the scope of the present invention. For example, while the present invention is described herein in connection with a mobile terminal, the present invention may also be used in connection with a wide variety of mobile communication systems and other wireless communication systems.

The embodiments described above are to be considered in all aspects as illustrative only and not restrictive in any manner. Thus, other exemplary embodiments, system architectures, platforms, and implementations that can support various aspects of the invention may be utilized without departing from the essential characteristics described herein. These and various other adaptations and combinations of features of the embodiments disclosed are within the scope of the invention. The invention is defined by the claims and their full scope of equivalents.

What is claimed is:

1. A mode switching method in a mobile communication system, the method comprising:

providing a mode switching start point between an uplink signal and a downlink signal of a transceiver, wherein providing the mode switching start point comprises determining a mode switching time (MST) of the transceiver, determining a minimum guard period ($GP_{min}$) of the transceiver, and determining if the MST is greater than the $GP_{min}$;

resetting the mode switching start point based on length of a guard period provided between the uplink signal and the downlink signal, wherein resetting the mode switching start point comprises determining an advancing time offset (Δt) based on the minimum guard period ($GP_{min}$), and setting the mode switching start point before a start point of the minimum guard period ($GP_{min}$) of the transceiver if the MST is greater than the $GP_{min}$; and starting mode switching at the mode switching start point.

2. The method of claim 1, wherein providing the mode switching start point further comprises calculating a time difference between the advancing time offset (Δt) and the start point of $GP_{min}$.

3. The method of claim 1, wherein the advancing time offset (Δt) is less than the $GP_{min}$.

4. The method of claim 2, further comprising performing mode switching according to the mode switching start point.

5. A mode switching method comprising:

providing a mode switching start point between an uplink signal and a downlink signal of a transceiver;

determining an advancing time offset (Δt) based on a minimum guard period ($GP_{min}$);

setting the mode switching start point before a start point of the $GP_{min}$ of the transceiver based on a mode switching signal;

starting mode switching at the mode switching start point;

determining a mode switching time (MST) of the transceiver;

determining whether the MST is greater than the $Gp_{min}$; and setting the mode switching start point before the start point of the $GP_{min}$ of the transceiver if the MST is greater than the $GP_{min}$, wherein determining the mode switching start point reset, if the MST is greater than the $GP_{min}$.

6. A mode switching system in a mobile communication system comprising:

means for providing a mode switching start point between an uplink signal and a downlink signal of a transceiver, wherein providing the mode switching start point comprises:

determining a mode switching time (MST) of the transceiver, determining a minimum guard period ($GP_{min}$) of the transceiver, and determining whether the MST is greater than the $GP_{min}$;

means for resetting the mode switching start point based on length of a guard period provided between the uplink signal and the downlink signal, wherein resetting the mode switching start point comprises determining an advancing time offset ($\Delta t$) based on the minimum guard period ($GP_{min}$), and setting the mode switching start point before a start point of the minimum guard period ($GP_{min}$) of the transceiver if the MST is greater than the $GP_{min}$; and means for starting mode switching at the mode switching start point.

7. The system of claim 6, wherein the means for providing the mode switching start point further comprises a time difference between the advancing time offset ($\Delta t$) and the start point of $GP_{min}$.

8. system of claim 6, wherein the advancing time offset ($\Delta t$) is less than the $GP_{min}$.

9. The system of claim 7, where the means for starting mode switching further performs mode switching based on the mode switching start point.

10. A mode switching system comprising:

means for providing a mode switching start point between an uplink signal and a downlink signal of a transceiver;

means for determining an advancing time offset ($\Delta t$) based on a minimum guard period ($GP_{min}$);

means for setting the mode switching start point before a start point of the $GP_{min}$ of the transceiver based on a mode switching signal;

means for starting mode switching at the mode switching start point;

means for determining a mode switching time (MST) of the transceiver;

means for determining whether the MST is greater than the $GP_{min}$;

means for setting the mode switching start point before the start point of the $GP_{min}$ of the transceiver if the MST is greater than the $GP_{min}$; and means for determining the mode switching start point reset, if the MST is greater than the $GP_{min}$.

* * * * *